US012768458B2

(12) United States Patent
Lei

(10) Patent No.: US 12,768,458 B2
(45) Date of Patent: Oct. 20, 2026

(54) MULTI-WAY VALVE

(71) Applicant: HILITE AUTOMOTIVE TECHNOLOGY CO., LTD, Changshu (CN)

(72) Inventor: Congzhe Lei, Changshu (CN)

(73) Assignee: HILITE AUTOMOTIVE TECHNOLOGY CO., LTD, Changshu (CN)

( * ) Notice: Subject to any disclaimer, the term of this patent is extended or adjusted under 35 U.S.C. 154(b) by 138 days.

(21) Appl. No.: 18/811,787

(22) Filed: Aug. 22, 2024

(65) Prior Publication Data

US 2024/0410477 A1 Dec. 12, 2024

Related U.S. Application Data

(63) Continuation of application No. PCT/CN2023/077395, filed on Feb. 21, 2023.

(30) Foreign Application Priority Data

Feb. 23, 2022 (CN) ......................... 202210165689.8
Feb. 23, 2022 (CN) ......................... 202210167199.1
(Continued)

(51) Int. Cl.
*F16K 11/074* (2006.01)
*F16K 11/10* (2006.01)
*F16K 27/04* (2006.01)

(52) U.S. Cl.
CPC .......... *F16K 11/0743* (2013.01); *F16K 11/10* (2013.01); *F16K 27/045* (2013.01)

(58) Field of Classification Search
CPC .... F16K 11/0743; F16K 11/074; F16K 11/10; F16K 27/045
See application file for complete search history.

(56) References Cited

U.S. PATENT DOCUMENTS 2,009,616 A * 7/1935 Hanna .................. F16K 11/074
251/185
2,209,991 A * 8/1940 Mcgill ................ F16K 11/0743
251/159
(Continued)

FOREIGN PATENT DOCUMENTS

CN 1453490 A * 11/2003
CN 200999884 Y * 1/2008
(Continued)

OTHER PUBLICATIONS

International Search Report dated Jun. 13, 2023 in International Application No. PCT/CN2023/077395. English translation attached.
(Continued)

*Primary Examiner* — David Colon-Morales

(57) ABSTRACT

A multi-way valve includes a valve body and a valve core. The valve core includes a first valve core and a second valve core. The first valve core has at least one first valve core flow channel and the second valve core has at least one second valve core flow channel. An end of the valve body is provided with inner flow channel openings and outer flow channel openings. The inner flow channel openings are distributed along a circumferential direction, and the outer flow channel openings are distributed at an outer side of the inner flow channel openings in a radial direction, the inner flow channel openings are in communication with the at least one first valve core flow channel, and the outer flow channel openings are in communication with the at least one second valve core flow channel.

20 Claims, 8 Drawing Sheets

(30) Foreign Application Priority Data

| | | |
|---|---|---|
| Apr. 22, 2022 | (CN) | 202210432713.X |
| Apr. 22, 2022 | (CN) | 202220950244.6 |
| Jul. 4, 2022 | (CN) | 202221706280.4 |
| Jul. 4, 2022 | (CN) | 202221708896.5 |

(56) References Cited

U.S. PATENT DOCUMENTS

| | | | | | |
|---|---|---|---|---|---|
| 2,209,992 | A * | 8/1940 | Mcgill | F16K 3/10 | 137/625.29 |
| 2,364,697 | A * | 12/1944 | Daniels | F16K 11/0743 | 251/283 |
| 2,578,160 | A * | 12/1951 | Van Der Werff | F16K 11/0743 | 137/625.22 |
| 2,653,003 | A * | 9/1953 | Overbeke | F16K 11/0743 | 137/625.21 |
| 2,745,434 | A * | 5/1956 | Stevenson | F16K 11/0743 | 251/283 |
| 2,907,349 | A * | 10/1959 | White | F15B 13/04 | 137/625.46 |
| 3,451,428 | A * | 6/1969 | Pruett | F16K 11/0743 | 137/625.46 |
| 3,537,680 | A * | 11/1970 | Zajac | F16K 11/0743 | 251/182 |
| 3,561,479 | A * | 2/1971 | Archer | F15B 13/04 | 137/625.21 |
| 3,613,731 | A * | 10/1971 | Whitlock | F16K 11/0743 | 137/625.29 |
| 3,633,623 | A * | 1/1972 | Perry | F16K 11/0743 | 137/625.46 |
| 3,702,143 | A * | 11/1972 | Van Wagenen | F03C 1/0615 | 137/625.21 |
| 3,768,516 | A * | 10/1973 | Cyphelly | F16K 11/0743 | 137/625.46 |
| 4,281,684 | A * | 8/1981 | Broeg | F16K 11/074 | 137/625.21 |
| 4,294,285 | A * | 10/1981 | Joslyn | F16K 11/0743 | 137/614.16 |
| 5,787,930 | A * | 8/1998 | Toyama | F25B 41/26 | 137/625.46 |
| 7,500,490 | B2 * | 3/2009 | Wagner | B01D 53/0446 | 95/138 |
| 8,079,384 | B2 * | 12/2011 | Chen | F16K 3/0236 | 251/363 |
| 10,422,433 | B2 * | 9/2019 | Tanaka | F25B 41/325 | |
| 10,487,857 | B2 * | 11/2019 | Elgamil | F16K 39/045 | |
| 11,939,981 | B2 * | 3/2024 | Chapman | F16K 11/0743 | |
| 11,953,104 | B2 * | 4/2024 | Babicki | F16K 11/074 | |
| 11,965,604 | B2 * | 4/2024 | Wang | F16K 17/26 | |
| 12,247,959 | B2 * | 3/2025 | Otsubo | G01N 30/26 | |
| 12,320,432 | B2 * | 6/2025 | Qu | F16K 31/041 | |
| 2008/0173364 | A1 | 7/2008 | Degner et al. | | |
| 2009/0071559 | A1 | 3/2009 | Peng | | |
| 2015/0226470 | A1 | 8/2015 | Jing et al. | | |
| 2021/0131575 | A1 | 5/2021 | Bunda et al. | | |

FOREIGN PATENT DOCUMENTS

| | | | | | |
|---|---|---|---|---|---|
| CN | 201348065 | Y | | 11/2009 | |
| CN | 204083365 | U | | 1/2015 | |
| CN | 111350840 | A | * | 6/2020 | F16K 31/041 |
| CN | 111350841 | A | * | 6/2020 | F16K 31/041 |
| CN | 111981163 | A | | 11/2020 | |
| CN | 113154088 | A | | 7/2021 | |
| CN | 113251179 | A | | 8/2021 | |
| CN | 214529788 | U | | 10/2021 | |
| CN | 215950468 | U | | 3/2022 | |
| CN | 216131420 | U | | 3/2022 | |
| CN | 114635991 | A | | 6/2022 | |
| CN | 114636003 | A | | 6/2022 | |
| CN | 114673806 | A | | 6/2022 | |
| CN | 218000495 | U | | 12/2022 | |
| CN | 220452788 | U | | 2/2024 | |
| JP | 2016098965 | A | | 5/2016 | |
| RU | 2374506 | C1 | | 11/2009 | |

OTHER PUBLICATIONS

The First Office Action from corresponding Chinese Application No. 202210167199.1 dated Jan. 11, 2023. English translation attached.

The Grant Notice from corresponding Chinese Application No. 202210167199.1 dated Feb. 25, 2023. English translation attached.

The First Office Action from corresponding Chinese Application No. 202210432713.X dated Jan. 13, 2023. English translation attached.

The Grant Notice from corresponding Chinese Application No. 202210432713.X dated Mar. 3, 2023. English translation attached.

The Grant Notice from corresponding Chinese Application No. 202220950244.6 dated Nov. 2, 2022. English translation attached.

The Grant Notice from corresponding Chinese Application No. 202221706280.4 dated Sep. 28, 2022. English translation attached.

The Grant Notice from corresponding Chinese Application No. 202221708896.5 dated Oct. 19, 2022. English translation attached.

First Office Action dated Jun. 27, 2025 received in corresponding patent family application No. CN202310146082.X. English translation attached.

Extended European Search Report dated Feb. 3, 2026 received in corresponding patent family European Application No. EP23759162.3.

Second Office Action dated Jan. 21, 2026 received in corresponding patent family application No. CN202310146082.X. English translation attached.

Grant Notice dated Apr. 16, 2026 received in corresponding patent family application No. CN202310146082.X. English translation attached.

* cited by examiner

MULTI-WAY VALVE

CROSS-REFERENCE TO RELATED APPLICATION

This application is a continuation of International Application No. PCT/CN2023/077395, filed on Feb. 21, 2023, which claims priority to following Chinese Patent Applications:

1) No. 202210165689.8, filed on Feb. 23, 2022;
2) No. 202210167199.1, filed on Feb. 23, 2022;
3) No. 202210432713.X, filed on Apr. 22, 2022;
4) No. 202220950244.6, filed on Apr. 22, 2022;
5) No. 202221706280.4, filed on Jul. 4, 2022;
6) No. 202221708896.5, filed on Jul. 4, 2022.

The disclosures of the aforementioned applications are hereby incorporated by reference in their entireties.

FIELD

The present disclosure relates to a multi-way valve.

BACKGROUND

At present, in an application of thermal management of new energy vehicles, for an application of water valves, butterfly valves, ball valves, column valves, and other designs are mostly used. A connection of the water valve engaged with a flow channel plate is used to complete switching, merging, and diverting of a coolant. A fluid flow direction of the above water valve is mainly controlled by a valve core. Flow channel openings are irregularly arranged, resulting in problems of a chaotic pipe arrangement and an effect of pipe arrangement on mounting of other components such as an actuator. In addition, because a valve body needs to be designed according to the valve core, applicability of a valve is poor.

In order to solve the above problems, an existing manner is to use a disc valve, and all the flow channel openings of the disc valve are integrated at a side surface of the valve body, to facilitate a pipe arrangement of an opponent part and a flow channel design. An existing problem of the manner is that after fluid passes through the valve core, the valve core is pressed at a single side by an uneven force, which easily leads to the valve core or the sealing member having a too large local friction force and being easy to wear or leads to a fluid leakage due to inclining of the valve core.

In view of this, it is necessary to improve the existing ones to solve the above problems.

SUMMARY

An object of the present disclosure is to provide a multi-way valve, to solve a problem of inclining and wear of the valve core caused by an uneven pressure applied on a valve core of an existing disc valve.

In order to achieve the above object, the present disclosure provides a multi-way valve. The multi-way valve includes a valve body and a valve core. The valve core is rotatably disposed in the valve body. The valve core includes a first valve core and a second valve core. Each of the first valve core and the second valve core has a valve core flow channel defined therein. An end of the valve body is provided with a flow channel opening in communication with the valve core flow channel in the first valve core and the valve core flow channel in the second valve core, respectively.

As a further improvement of the present disclosure, the valve core flow channel in the first valve core and the valve core flow channel in the second valve core have opposite openings.

As a further improvement of the present disclosure, the first valve core and the second valve core are symmetrically arranged relative to a plane perpendicular to an axis of the valve core.

As a further improvement of the present disclosure, a projection of the valve core flow channel in the first valve core in an axial direction coincides with a projection of the valve core flow channel in the second valve core in the axial direction.

As a further improvement of the present disclosure, the multi-way valve further includes a valve cover. The flow channel opening is formed on the valve cover and includes an inner flow channel opening and an outer flow channel opening. The inner flow channel opening includes a plurality of inner flow channel openings uniformly distributed along a circumference of an axis of the valve core, and the outer flow channel opening includes a plurality of outer flow channel openings distributed along a periphery of a circumference formed by the plurality of inner flow channel openings.

As a further improvement of the present disclosure, the valve body has an outer flow channel defined therein, the outer flow channel is in communication with the valve core flow channel in the second valve core and the outer flow channel opening. The valve body has a valve core mounting cavity defined therein. The outer flow channel is in an L shape. A bottom of the valve core mounting cavity is spaced apart from a bottom of the valve body. The outer flow channel includes a plurality of outer flow channels distributed around the valve core mounting cavity. An end of the valve core mounting cavity away from the flow channel opening is provided with a plurality of communication holes in communication with the plurality of outer flow channels in a one-to-one correspondence. Each of the valve core flow channel in the first valve core and the valve core flow channel in the second valve core is in communication with at least two flow channel openings, and the first valve core and the second valve core are formed as one piece or separate parts.

As a further improvement of the present disclosure, an end of the valve body provided with the flow channel opening and the valve body are formed as one piece or separate parts. When the end of the valve body is separated from the valve body, the end of the valve body serves as a valve cover of the valve body and is fixedly mounted on the valve body.

As a further improvement of the present disclosure, a positioning rod is arranged in the valve core and configured to position the valve core. The valve cover has a positioning hole defined thereon, and the positioning rod is inserted into the positioning hole. The other end of the valve body is mounted with a transmission shaft. A transmission sleeve is arranged in the valve core and configured to connect the transmission shaft. An outer sealing member engaged with the valve body and the valve core is mounted inside the valve cover. The outer sealing member has a through hole corresponding to the flow channel opening. An inner sealing member engaged with the valve core is arranged at an end of the valve core mounting cavity close to the communication hole. The inner sealing member has a through hole corresponding to the plurality of communication holes.

The present disclosure also provides a multi-way valve. The multi-way valve includes a valve body and a valve core rotatably disposed in the valve body. The valve core includes a first valve core and a second valve core. Each of the first valve core and the second valve core has a plurality of valve core flow channels defined therein, and an end of the valve body is provided with a flow channel opening in communication with the plurality of valve core flow channels of the first valve core and the plurality of valve core flow channels on the second valve core, respectively. The first valve core and the second valve core are formed as separate parts. The valve core further includes a transmission assembly configured to drive the first valve core and the second valve core to move in a linkage manner. One of the first valve core and the second valve core is a driving valve core, and the other one of the first valve core and the second valve core is a driven valve core. One of the first valve core and the second valve core that is in the power connection with the transmission shaft is a driving valve core, and the other one of the first valve core and the second valve core is a driven valve core. The driven valve core is driven by the driving valve core to rotate by the transmission assembly.

As a further improvement of the present disclosure, the multi-way valve further includes a valve cover mounted at an end surface of the valve body. The flow channel opening includes a plurality of flow channel openings defined at the valve cover. The plurality of flow channel openings include inner flow channel openings and outer flow channel openings formed at an end of the valve body in an axial direction. The outer flow channel opening is formed at an outer side of the inner flow channel opening in a radial direction. The valve body has a valve body flow channel defined therein, the valve body flow channel is in communication with the outer flow channel openings and the second valve core.

As a further improvement of the present disclosure, the first valve core and the second valve core are engaged and connected with each other via a bearing. The valve body has a transmission shaft defined therein. The transmission shaft is in a power connection with the first valve core and/or the second valve core. The transmission shaft and the first valve core and/or the second valve core are formed as one piece or separate parts.

As a further improvement of the present disclosure, the transmission assembly is composed of at least one group of structure components. Each group of the at least one group of structure components includes at least two structure members. The at least two structure members are arranged at the driving valve core and the driven valve core, respectively, to enable one of the at least two structure members, when rotating with the driving valve core, to be in contact with another one of the at least two structure members, and when two of the at least two structure members are in contact, to enable the driving valve core to drive the driven valve core to rotate.

As a further improvement of the present disclosure, each of the at least one group of structure components is composed of two blocking blocks. The two blocking blocks being fixedly connected to the driving valve core and the driven valve core, respectively, or the two blocking blocks being formed as one piece with the driving valve core and the driven valve core.

As a further improvement of the present disclosure, the transmission assembly is a one-way bearing. The first valve core and the second valve core are connected to two ring members of the one-way bearing, respectively, to enable the driving valve core in the first valve core and the second valve core to drive the driven valve core in the first valve core and the second valve core to rotate when the driving valve core rotates in one direction, and to enable the driving valve core not to drive the driven valve core to rotate when the driving valve core rotates in another direction.

As a further improvement of the present disclosure, the transmission assembly is composed of a ratchet wheel and a plurality of elastic sheets. Each of the plurality of elastic sheets has an end engaged with the ratchet wheel, to enable the driving valve core to drive the driven valve core to rotate when the driving valve core rotates in one direction and not to drive the driven valve core to rotate when the driving valve core rotates in the other direction.

The present disclosure also provides a multi-way valve. The multi-way valve includes a valve body and a valve core that is rotatable. The valve core has at least one through flow channel penetrating the valve core in an axial direction and at least one horizontal flow channel extending in a radial direction. The at least one horizontal flow channel includes a first horizontal flow channel and a second horizontal flow channel that have opposite openings in the axial direction. A projection of the first horizontal flow channel in the axial direction coincides with a projection of the second horizontal flow channel in the axial direction, and an end of the valve body is provided with a flow channel opening in communication with the first horizontal flow channel and the second horizontal flow channel, respectively.

As a further improvement of the present disclosure, an end of the valve body is further provided with a flow channel opening in communication with the at least one through flow channel. The flow channel opening includes an inner flow channel opening and an outer flow channel opening that are disposed at an end of the valve body in the axial direction. The outer flow channel opening is disposed at an outer side of the inner flow channel opening in the radial direction. The multi-way valve further includes an outer flow channel. The inner flow channel opening is configured to be in communication with the first horizontal flow channel and the at least one through flow channel, and the outer flow channel is configured to communicate an end of the at least one through flow channel away from the flow channel opening with the outer flow channel opening; and communicate the second horizontal flow channel with the outer flow channel opening.

As a further improvement of the present disclosure, the valve core further includes a composite flow channel and a shielding plate disposed in the composite flow channel. The composite flow channel penetrates the valve core in the axial direction, and the shielding plate partially shields the composite flow channel in the radial direction.

As a further improvement of the present disclosure, an outer sealing member slot is formed on the valve cover by inwardly recessing a side of the valve cover facing towards the body, and the multi-way valve further includes an outer sealing member disposed in the outer sealing member slot. The outer sealing member abuts against the valve core to isolate the through flow channel and/or the first horizontal flow channel from each other. The multi-way valve further includes an inner sealing member abutting against the valve core to isolate the through flow channel and/or the second horizontal flow channel from each other.

The present disclosure also provides a multi-way valve. The multi-way valve includes a valve body, a valve cover disposed at an end of the valve body, and a valve core rotatably disposed in the valve body. The valve core has at least one first valve core flow channel and at least one second valve core flow channel that have openings oppositely disposed in an axial direction; and a same end of each of the valve cover and the valve body is provided with a flow channel opening in communication with the at least one first valve core flow channel and the at least one second valve core flow channel, respectively.

As a further improvement of the present disclosure, the valve core is surrounded by the valve body, and the valve body and the valve cover are provided with an outer flow channel in communication with the at least one second valve core flow channel. The outer flow channel is disposed at an outer side of the valve core and an outer side of the valve cover in a radial direction. The valve cover has an inner flow channel opening in communication with the at least one first valve core flow channel, and an end of the valve body is provided with an outer flow channel opening in communication with the outer flow channel and the at least one second valve core flow channel. A projection of the at least one first valve core flow channel in the axial direction coincides with a projection of the at least one second valve core flow channel having an opening opposite to the at least one first valve core flow channel in the axial direction. The inner flow channel opening and the outer flow channel opening are each arranged in a circumferential array along an axis of the valve core.

As a further improvement of the present disclosure, the multi-way valve further includes an inner sealing member disposed at an end of the valve core away from the valve cover and abutting against the valve core. The valve core is located in the valve body at a lower level than an end surface of the valve body, the valve cover being accommodated in the valve body, and an end surface of the valve cover being flush with the end surface of the valve body.

As a further improvement of the present disclosure, two or four valve core flow channels are provided in a first valve core, and two or four valve core flow channels are provided in a second valve core.

As a further improvement of the present disclosure, each of the first valve core and the second valve core having two valve core flow channels includes a third valve core flow channel and a fourth valve core flow channel defined therein, a separator configured to separate the third valve core flow channel from the fourth valve core flow channel, and an abutting plate configured to be connected to the separator and disposed at a middle part of the first valve core and a middle part of the second valve core. An accommodation cavity is enclosed by the abutting plate and has a circular cross section. A connection shaft is disposed in the accommodation cavity of the first valve core, and a rotation shaft is disposed in the accommodation cavity of the second valve core.

As a further improvement of the present disclosure, the first valve core having two valve core flow channels includes a third valve core flow channel and a fourth valve core flow channel, a first separator configured to separate the third valve core flow channel from the fourth valve core flow channel, and an abutting plate configured to be connected to the first separator and disposed at a middle part of the first valve core, an accommodation cavity being enclosed by the abutting plate and having a circular cross section, and a connection shaft being disposed in the accommodation cavity. The second valve core has four valve core flow channels including a common flow channel, an opposite flow channel, and a second separator configured to separate the common flow channel from the opposite flow channel, a side of the second valve core away from the first valve core being provided with a rotation shaft, and the rotation shaft and the second valve core being coaxially arranged and located in the opposite flow channel.

Beneficial effects of the present disclosure include that by providing the first valve core and the second valve core, a multi-way valve according to the present disclosure can balance a pressure at each of two sides of the valve core and prevent the valve core from inclining and further increasing wear.

Each valve core is provided with a plurality of flow channels in a predetermined manner. A plurality of flow channel openings are provided in the valve body and/or the valve cover in a predetermined manner. The number of flow channel openings in communication with an external pipeline can be selected according to an actual situation, and sealing processing can be performed on other flow channel openings. Based on this, the valve has good compatibility.

Although the valve core is composed of two parts, i.e., a first valve core and a second valve core, all the flow channel openings are integrated at an axial end surface of the valve body, which is convenient for pipe arrangement and mounting of an actuator and facilitates mounting of an opponent part. Moreover, since the flow channel opening is predetermined, a design of flow channel arrangement in the valve core can be changed without changing the valve body.

The number of flow channels that can be provided in the valve core is more, with wider practicality. Moreover, choosability of the flow channel is increased, and a design of a flow channel passage is facilitated.

A friction force between the first valve core and the second valve core is reduced by a bearing, and coaxiality of the first valve core and the second valve core is increased by the bearing. Moreover, the transmission assembly is provided between the first valve core and the second valve core. Power can be transmitted through the transmission assembly, such that the transmission shaft only needs to be connected to one valve core and can drive the two valve cores to rotate.

By providing the through flow channel, more working modes are provided.

By providing a pony-size valve cover, only the valve cover is provided on the valve core, and a volume of the valve cover and a volume of the outer sealing member can be lowered, thereby lowering a cost. Moreover, the valve cover and the outer sealing member are more easily mounted without considering static sealing at the outer side of the valve core, to lower influence of an assembly of the valve cover on sealing of the outer flow channel and the inner flow channel. The valve core recesses to provide the valve cover inside the valve body, such that an overall height of the multi-way valve can be lowered.

Two flow channels are provided in each of the first valve core and/or the second valve core. In this way, the number of flow channels per unit area is reduced, and an area of the flow channel is increased. Further, a flow resistance of fluid can be reduced.

DETAILED DESCRIPTION

Figure 1:
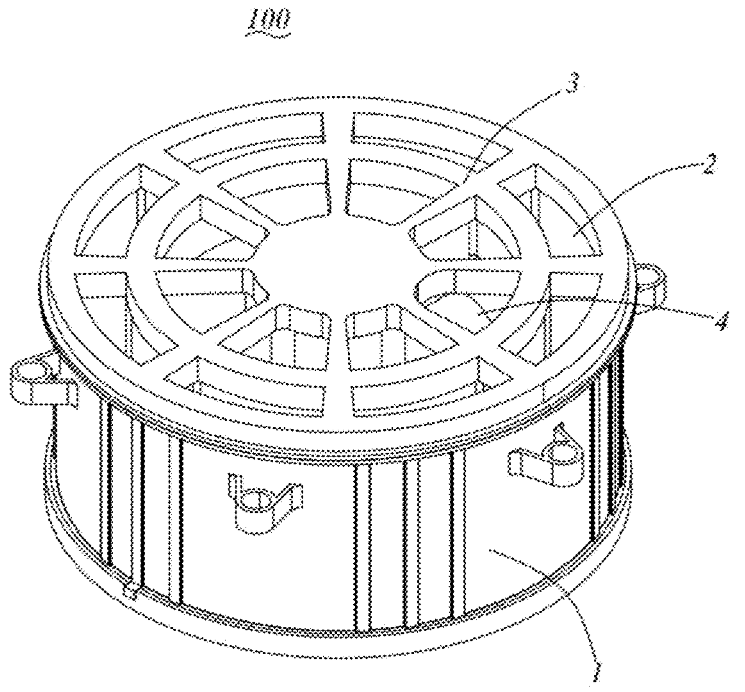
FIG. 1 is a schematic structural view of a multi-way valve according to the present disclosure.

Technical solutions of the present disclosure will be described clearly and completely below in combination with accompanying drawings. Obviously, the embodiments described below are a part of the embodiments of the present disclosure, rather than all the embodiments of the present disclosure. On a basis of the embodiments in the present disclosure, all other embodiments obtained by a person skilled in the art without creative labor shall fall within the protection scope of the present disclosure.

In the description of the present disclosure, it needs to be noted that, orientation or position relationship indicated by terms such as “center”, “over”, “below”, “left”, “right”, “vertical”, “horizontal”, “inner”, “outer”, etc., is based on the orientation or position relationship illustrated in the accompanying drawings, and is merely for the convenience of describing the present disclosure and simplifying the description, rather than indicating or implying that the associated device or element must have a specific orientation, or be constructed and operated in a specific orientation, and therefore cannot be understood as a limitation on the present disclosure. In addition, the terms “first”, “second”, “third”, and the like are used for descriptive purposes only and are not to be understood as indicating or implying relative importance.

In the description of the present disclosure, it needs to be noted that, unless specified and defined otherwise explicitly, the terms “mounted”, “coupled”, and “connected” should be interpreted in a broad sense. For example, it may be a fixed connection or a detachable connection or connection as one piece; a mechanical connection or an electrical connection; a direct connection or an indirect connection through an intermediate; or an internal communication of two components. For those of ordinary skill in the art, the specific meaning of the above-mentioned terms in the present disclosure can be understood according to specific circumstances. In addition, technical features related to different implementations of the present disclosure described below may be combined with each other as long as they do not conflict with each other.

As shown in FIG. 1 to FIG. 26, the multi-way valve 100 of the present disclosure includes the following embodiments according to different technical features.

First Embodiment

Referring to FIG. 1 to FIG. 5, the multi-way valve 100 of this embodiment includes a valve body 1, a valve core 4, and a transmission shaft 7. The valve core 4 is rotatably disposed in the valve body 1.

A plurality of flow channel openings are disposed at an end of the valve body 1. The valve core 4 has a valve core flow channel defined therein, the valve core flow channel is in communication with at least two flow channel openings. An end surface of the valve body 1 has a blind hole as a valve core mounting cavity 11 defined thereon. Moreover, a valve cover 3 is mounted on the end surface. Each flow channel opening is integrated on the valve cover 3. The valve core 4 is mounted inside the valve core mounting cavity 11. Another end surface of the valve body 1 is mounted with the transmission shaft 7. The transmission shaft 7 penetrates the end surface of the valve body 1 and is connected to the valve core 4 by a key pin. A sealing end surface of the valve body 1 is provided with a rotation shaft positioning block 8 for positioning the transmission shaft 7. The rotation shaft positioning block 8 is also internally provided with a sealing member and a sealing structure that are used for sealing a gap between the transmission shaft 7 and the rotation shaft positioning block 8. When the flow channel opening is connected to an external fluid system, fluid in a pipeline flows through one flow channel opening to enter the valve core 4 and flow out of another flow channel opening.

Figure 2:
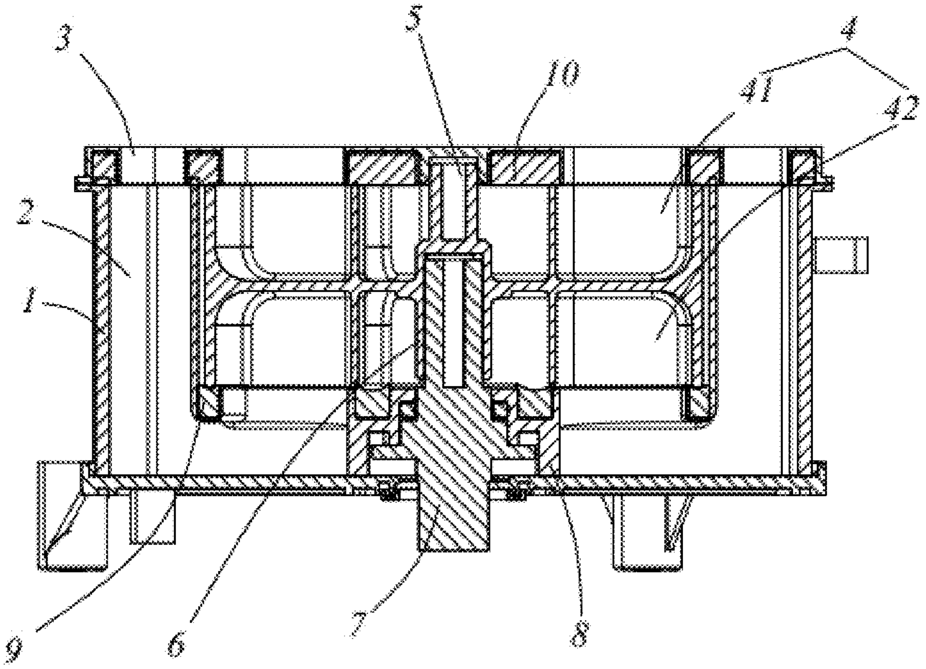
FIG. 2 is a schematic sectional view of a structure of a multi-way valve according to a first embodiment of the present disclosure.

Referring to FIG. 2, the valve core 4 is composed of a first valve core 41 and a second valve core 42 that are symmetrically arranged and integrally arranged with each other, which means that a valve core flow channel in the first valve core 41 and a valve core flow channel in the second valve core 42 have opposite openings, also means that a projection of the first valve core 41 in an axial direction coincides with a projection of the second valve core 42 in the axial direction, and further means that a projection of the valve core flow channel in the first valve core 41 in the axial direction coincides with a projection of the valve core flow channel in the second valve core 42 in the axial direction.

The first valve core 41 and the second valve core 42 may be separated from each other. An end of the valve body 1 provided with the flow channel opening is integrally arranged with or separated from the valve body 1. When the end of the valve body 1 is separated from the valve body 1, the end of the valve body 1 serves as a valve cover 3 of the valve body 1 and is fixedly mounted on the valve body 1.

Figure 3:
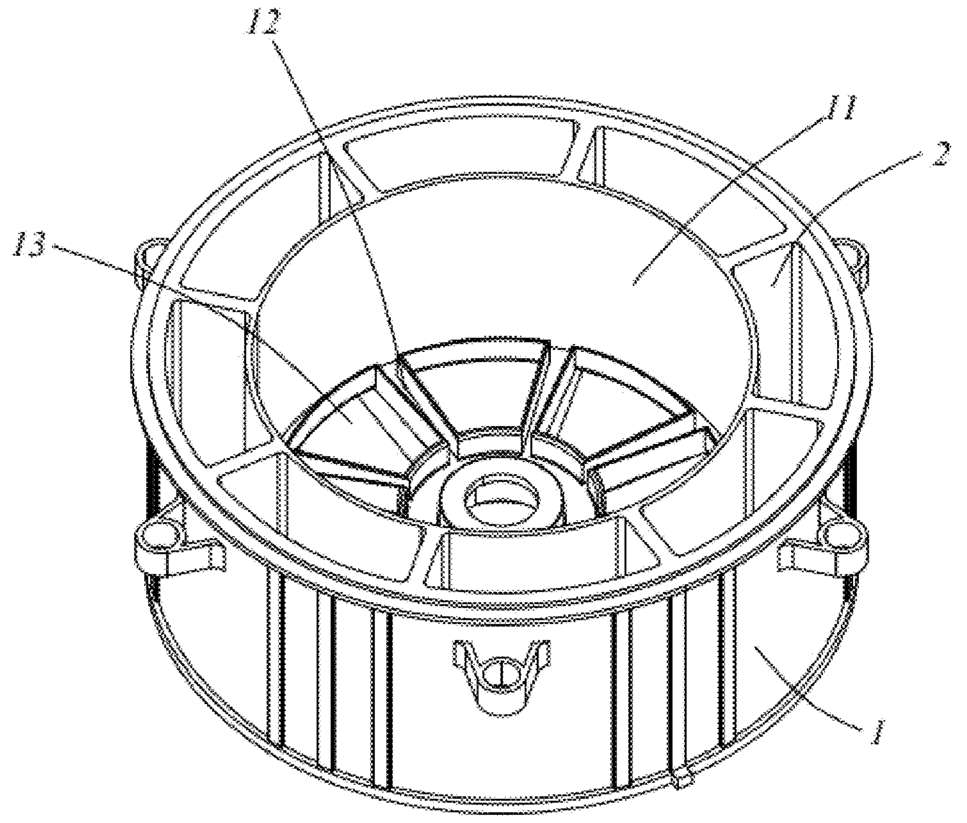
FIG. 3 is a schematic structural view of a valve body of a multi-way valve according to a first embodiment of the present disclosure.
Figure 4:
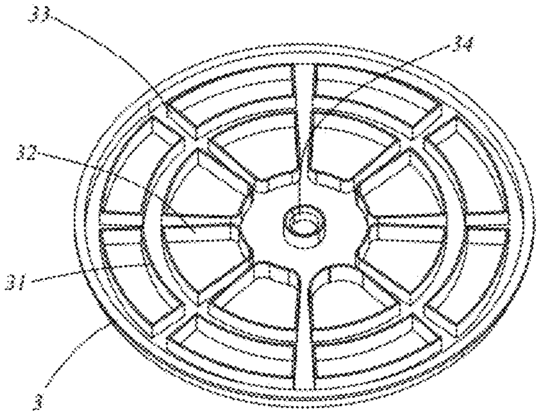
FIG. 4 is a schematic structural view of a valve cover of a multi-way valve according to a first embodiment of the present disclosure.

Referring to FIG. 3 and FIG. 4, the valve body 1 has a plurality of independent outer flow channels 2 defined therein, and the plurality of independent outer flow channels 2 are uniformly distributed along a circumference and a valve core mounting cavity 11 concentric with the valve body 1. The outer flow channel 2 is in an L shape. A bottom of the valve core mounting cavity 11 is not in contact with a bottom 8 of the valve body 1. The outer flow channels 2 are distributed around the valve core mounting cavity 11. The valve core 4 is mounted in the valve core mounting cavity 11. The bottom of the valve core mounting cavity 11 is provided with a plurality of communication holes 13 in communication with the plurality of outer flow channels 2 in a one-to-one correspondence.

The valve cover 3 has an outer flow channel opening 31 corresponding to each outer flow channel 2 and a plurality of inner flow channel openings 32 uniformly distributed at a circumference of the valve cover 3 corresponding to the valve core 4. The number of inner flow channel openings 32 is the same as the number of outer flow channel openings 31.

Figure 5:
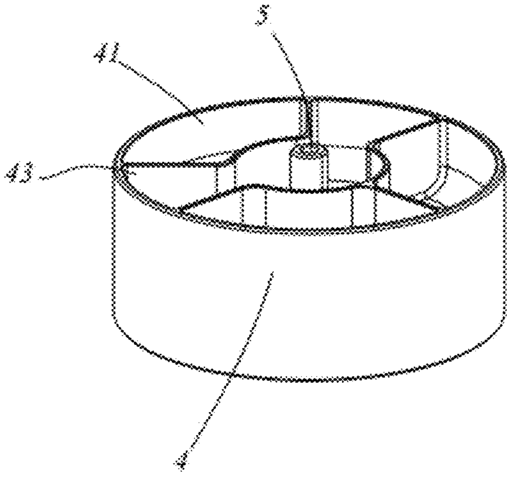
FIG. 5 is a schematic structural view of a valve core of a multi-way valve according to a first embodiment of the present disclosure.
Figure 6:
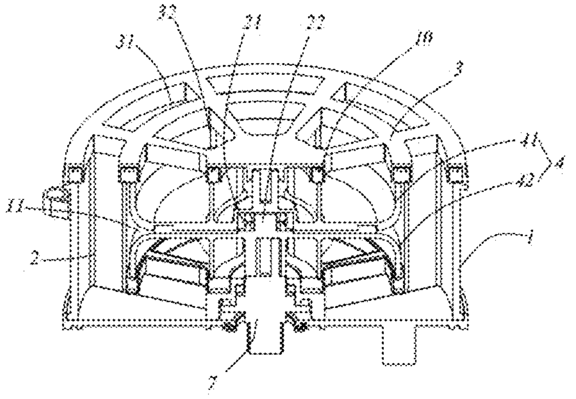
FIG. 6 is a schematic sectional view of a structure of a multi-way valve according to a second embodiment of the present disclosure.

Referring to FIG. 2 and FIG. 5, each of the first valve core 41 and the second valve core 42 has a blind hole defined therein, the blind hole is in communication with the inner flow channel opening 32 and a blind hole in communication with the communication hole 13, respectively. Moreover, each of the first valve core 41 and the second valve core 42 has a plurality of valve core separators 43 defined therein, and the plurality of valve core separators 43 are configured to separate the blind holes inside each of the first valve core 41 and the second valve core 42 into a plurality of valve core flow channels. Each of the plurality of valve core flow channels is configured to be in communication with at least two flow channel openings. The second valve core 42 is connected to the transmission shaft 7 by a key pin.

It needs to be noted that, in FIG. 2, the valve core flow channel in the first valve core 41 is not in communication with the valve core flow channel in the second valve core 42. At this time, the first valve core 41 controls a mutual communication relationship between the inner flow channel openings 32, and the second valve core 42 controls a mutual communication relationship between the outer flow channel openings 31, which does not mean that the valve core flow channel in the first valve core 41 cannot be in communication with the valve core flow channel in the second valve core 42. When a certain valve core flow channel in the first valve core 41 is in communication with a certain valve core flow channel in the second valve core 42, the fluid may flow through the first valve core 41, the second valve core 42, and the outer flow channel 2 after flowing into the inner flow channel opening 32, and finally flow out of the outer flow channel opening 31, and vice versa.

Referring to FIG. 2 to FIG. 4, an outer sealing member slot 33 is provided in the valve cover 3. The outer sealing member slot 33 has an outer sealing member 10 defined therein, and the outer sealing member 10 is configured to seal a contact surface between the first valve core 41 and the valve cover 3. The bottom of the valve core mounting cavity 11 has an inner sealing member slot 12 defined thereon. The inner sealing member slot 12 has an inner sealing member 9 defined therein, and the inner sealing member 9 is configured to seal a contact surface between the second valve core 42 and the bottom of the valve core mounting cavity 11.

A positioning rod 5 is arranged in the valve core 4 and is configured to position the valve core 4. The valve cover 3 has a positioning hole 34 engaged with the positioning rod 5. The valve core 4 has a transmission sleeve 6 defined therein, and the transmission sleeve 6 is configured to be connected to the transmission shaft 7.

In summary, when a double-valve-core integrated-port valve is in operation, at least two outer flow channel openings 31 and/or at least two inner flow channel openings 32 are externally connected to a fluid system, while other flow channel openings perform sealing processing. The fluid enters the outer flow channel 2 in the valve body 1 from one outer flow channel opening 31, enters the second valve core 42 after passing through the communication hole 13, then flows out of the valve core from another communication hole 13 through the valve core flow channel in the second valve core 42, and finally flows out of another outer flow channel opening 31 after passing through an outer flow channel 2 corresponding to the communication hole 13. Similarly, the fluid flows from one inner flow channel opening 32 into a valve core passage in the first valve core 41 and flows out of another inner flow channel opening 32. The transmission shaft 7 rotates to drive the valve core 4 to rotate, thereby adjusting the flow channel opening with which the valve core 4 is in communication, and the valve is closed when the valve core 4 is in communication with the closed flow channel opening.

Since the first valve core 41 and the second valve core 42 are symmetrically arranged relative to a plane perpendicular to an axis of the valve core 4, when a certain flow channel in the first valve core 41 is connected, a flow channel at a symmetrical position in the second valve core 42 is also connected. In this way, hydraulic pressures applied to upper and lower parts of the entire valve core 4 are the same, enabling a force applied to the entire valve core 4 to keep balance. Each valve core is provided with a plurality of flow channels in a predetermined manner. A plurality of flow channel openings are provided in the valve body and/or the valve cover in a predetermined manner. The number of flow channel openings in communication with an external pipeline may be selected according to an actual situation, and sealing processing may be performed on other flow channel openings. Based on this, the valve has good compatibility.

Although the valve core 4 is composed of two parts, i.e., the first valve core 41 and the second valve core 42, all the flow channel openings are integrated at an axial end surface of the valve body 1, which is convenient for pipe arrangement and mounting of an actuator and facilitates mounting of an opponent part. Moreover, since the flow channel opening is predetermined, a design of flow channel arrangement in the valve core 4 may be changed without changing the valve body 1.

Second Embodiment

Referring to FIG. 1, and FIG. 6 to FIG. 10, the multi-way valve of the embodiment includes a valve body 1, a valve core 4, and a valve cover 3. The valve body 1 has an inner cavity defined therein. The inner cavity is a valve core mounting cavity 11. The valve core 4 is rotatably mounted in the valve core mounting cavity 11. The valve cover 3 is fixedly mounted on the valve body 1. In an axial direction of the valve core 4, the valve body 1 has an end surface A and an end surface B. A plurality of flow channel openings are provided on the valve cover 3. A sealing member is disposed between the valve cover 3, the valve body 1, and the valve core 4. The sealing member is an outer sealing member 10.

The valve core 4 includes a valve core A close to the end surface A, i.e., a first valve core 41 and a valve core B close to the end surface B, i.e., a second valve core 42. Each of the first valve core 41 and the second valve core 42 has a plurality of valve core flow channels defined therein, and the plurality of valve core flow channels are not in communication with each other. Each valve core flow channel is in communication with at least two flow channel openings. The valve body 1 has a valve body flow channel defined therein, and the valve body flow is configured to be in communication with the flow channel opening and the second valve core 42, i.e., an outer flow channel 2.

The flow channel opening includes an inner flow channel opening 32 and an outer flow channel opening 31. The valve cover 3 has an outer flow channel opening 31 corresponding to each outer flow channel 2 and a plurality of inner flow channel openings 32 distributed corresponding to the valve core 4. The number of inner flow channel openings 32 is the same as the number of outer flow channel openings 31.

The first valve core 41 and the second valve core 42 are separated from each other. One of the first valve core 41 and the second valve core 42 is a driving valve core, and the other one of the first valve core 41 and the second valve core 42 is a driven valve core. A bearing 21 is provided between the first valve core 41 and the second valve core 42. A top of the second valve core 42 is provided with a positioning shaft 22. A bottom of the first valve core 41 is provided with a cavity for accommodating the bearing 21. The cavity described above is in an interference fit with an outer ring of the bearing 21. The positioning shaft 22 is in an interference fit with an inner ring of the bearing 21.

A transmission shaft 7 is mounted below the valve body 1 and in a power connection with the second valve core 42. A transmission assembly configured to transmit power between the first valve core 41 and the second valve core 42 is provided between the first valve core 41 and the second valve core 42. The transmission shaft 7 may also be mounted on the valve cover 3 and in a power connection with the first valve core 41. The transmission shaft 7 and the first valve core 41 or the second valve core 42 may be formed as one piece or separate. For forms of different transmission assemblies, the present disclosure of the patent provides the following implementations.

First Implementation

Figure 7:
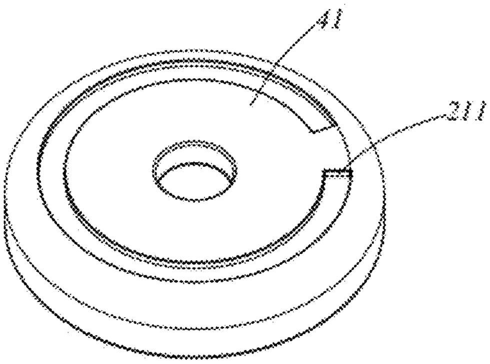
FIG. 7 is a schematic structural view of a first valve core of a multi-way valve of a first implementation in a second embodiment of the present disclosure.
Figure 8:
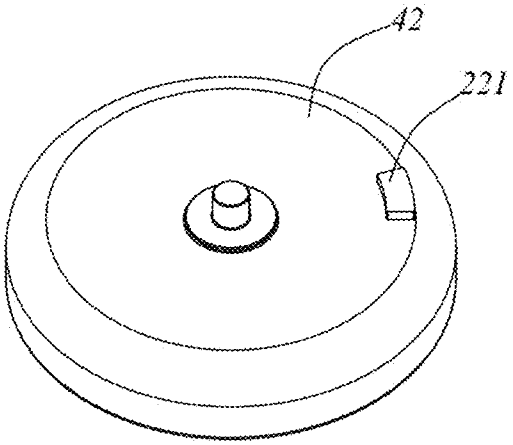
FIG. 8 is a schematic structural view of a second valve core of a multi-way valve of a first implementation in a second embodiment of the present disclosure.

Referring to FIG. 7 and FIG. 8, the transmission assembly is composed of a first blocking block 211 and a second blocking block 221. The first blocking block 211 and the second blocking block 221 are disposed on the first valve core 41 and the second valve core 42, respectively. In addition, in order to reduce a space, the first blocking block 211 is disposed in an annular groove on the first valve core 41. When the first valve core 41 rotates, the second blocking block 221 moves in the annular groove relatively. When the two blocking blocks are in contact with each other, the second valve core 42 may be driven by the first valve core 41 to rotate. During actual use, the second valve core 42 first rotates in one direction. When the two blocking blocks are in contact with each other, an angle position of the first valve core 41 is adjusted. After the first valve core 41 is in place, the second valve core 42 rotates in an opposite direction to adjust an angle position of the second valve core 42.

Second Implementation

The transmission assembly in the first implementation may be a one-way bearing. Accordingly, the one-way bearing is used to replace the bearing 21 in the first implementation. In this way, when the first valve core 41 rotates in one direction, the second valve core 42 may be driven to rotate. When the first valve core 41 rotates in the other direction, the second valve core 42 is not driven to rotate.

Third Implementation

Figure 9:
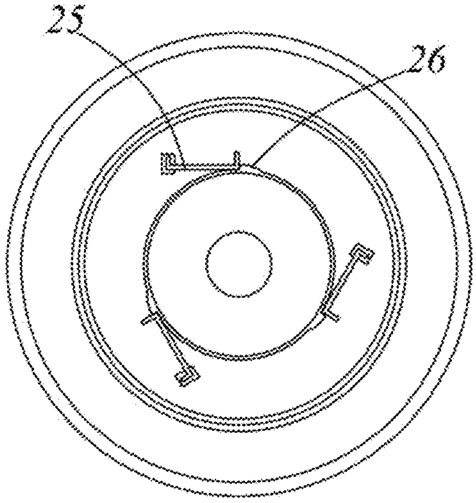
FIG. 9 is a schematic structural view of a valve core of a multi-way valve of a third implementation in a second embodiment of the present disclosure.

Referring to FIG. 9, the transmission assembly may be composed of a ratchet wheel 26 and a plurality of elastic sheets 25. The elastic sheets 25 are in an annular shape and uniformly disposed on the second valve core 42. The ratchet wheel 26 is fixedly disposed on the first valve core 41. The ratchet wheel 26 is engaged with the elastic sheet 25. In this way, when the first valve core 41 rotates in one direction, the second valve core 42 may be driven to rotate. When the first valve core 41 rotates in the other direction, the second valve core 42 is not driven to rotate.

Fourth Implementation

Figure 10:
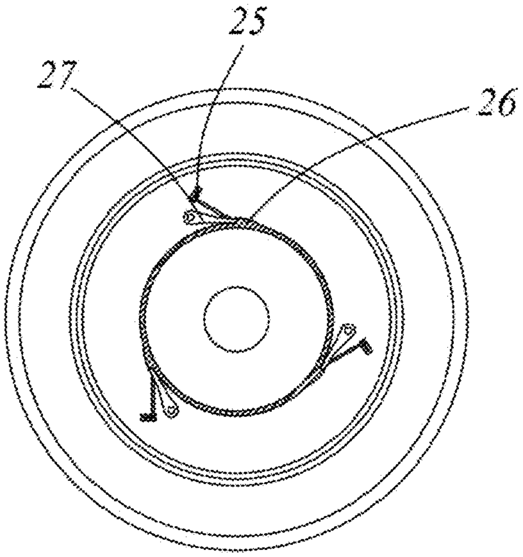
FIG. 10 is a schematic structural view of a valve core of a multi-way valve of a fourth implementation in a second embodiment of the present disclosure.
Figure 11:
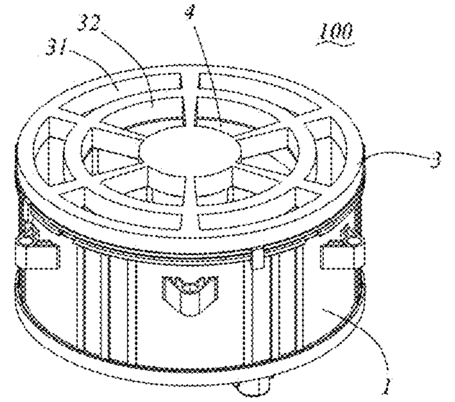
FIG. 11 is a schematic view of a three-dimensional structure of a third embodiment of the present disclosure.
Figure 12:
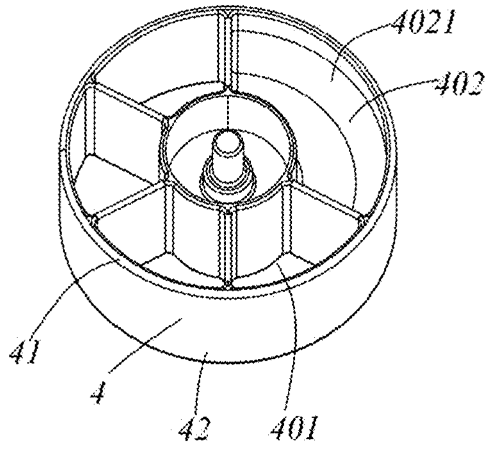
FIG. 12 is a schematic structural view of a valve core of a third embodiment of the present disclosure.

Referring to FIG. 10, the transmission assembly includes a rotation rod 27. The elastic sheet 25 is configured to apply a force towards the ratchet wheel 26 to the rotation rod 27, to ensure an engagement of the rotation rod 27 with the ratchet wheel 26.

Third Embodiment

As shown in FIG. 11 to FIG. 15, in the embodiment, the multi-way valve 100 includes a valve body 1, a valve core 4 disposed in the valve body 1, a first sealing member, i.e., an outer sealing member 10, a second sealing member, i.e., an inner sealing member 9, a connection flow channel, i.e., an outer flow channel 2, and a transmission shaft 7 configured to drive the valve core 4 to rotate. The valve core 4 is disposed in the valve body 1.

The valve core 4 has at least one through flow channel 401 penetrating the valve core 4 in an axial direction, at least one horizontal flow channel 402 extending in a radial direction, a composite flow channel 403 and a shielding plate 404 disposed in the composite flow channel 403, and a support member 405 disposed at an end of the valve core 4 in the axial direction. The valve core 4 includes a first valve core 41 and a second valve core 42 having an opposite opening to the first valve core 41.

The horizontal flow channel 402 includes a first horizontal flow channel 4021 and a second horizontal flow channel 4022 that have opposite openings in the axial direction. A projection of the first horizontal flow channel 4021 in the axial direction coincides with a projection of the second horizontal flow channel 4022 in the axial direction. In this embodiment, a depth of the first horizontal flow channel 4021 and a depth of the second horizontal flow channel 4022 are not limited, i.e., the depth of the first horizontal flow channel 4021 may be the same as or different from the depth of the second horizontal flow channel 4022.

Figure 13:
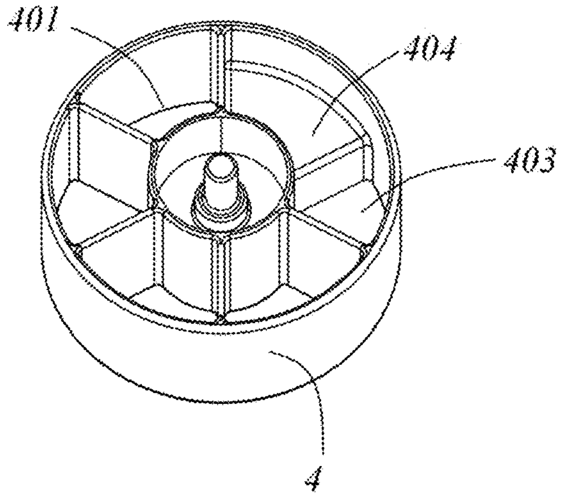
FIG. 13 is a schematic structural view of another valve core of a third embodiment of the present disclosure.
Figure 14:
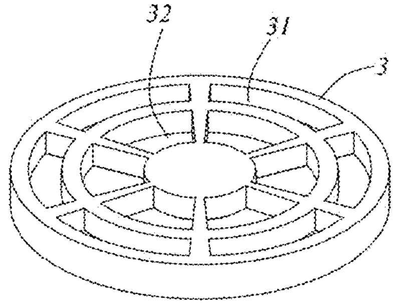
FIG. 14 is a schematic structural view of a valve cover of a third embodiment of the present disclosure.
Figure 15:
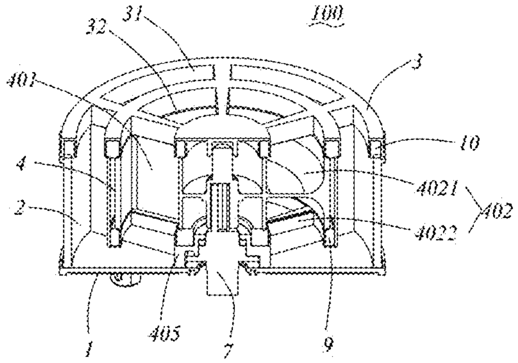
FIG. 15 is a schematic view of a three-dimensional structure of a third embodiment of the present disclosure after being cut by half along a medial surface.
Figure 16:
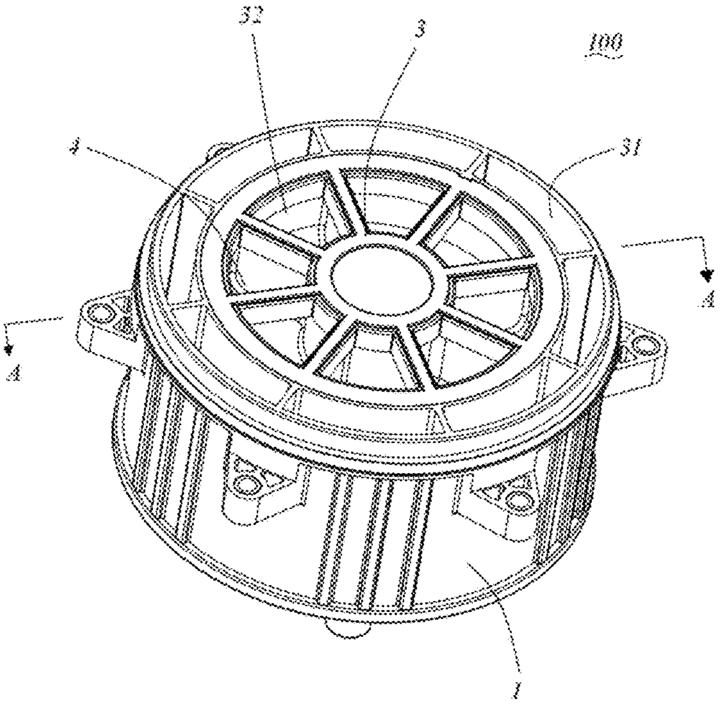
FIG. 16 is a schematic view of a three-dimensional structure of a fourth embodiment of the present disclosure.
Figure 17:
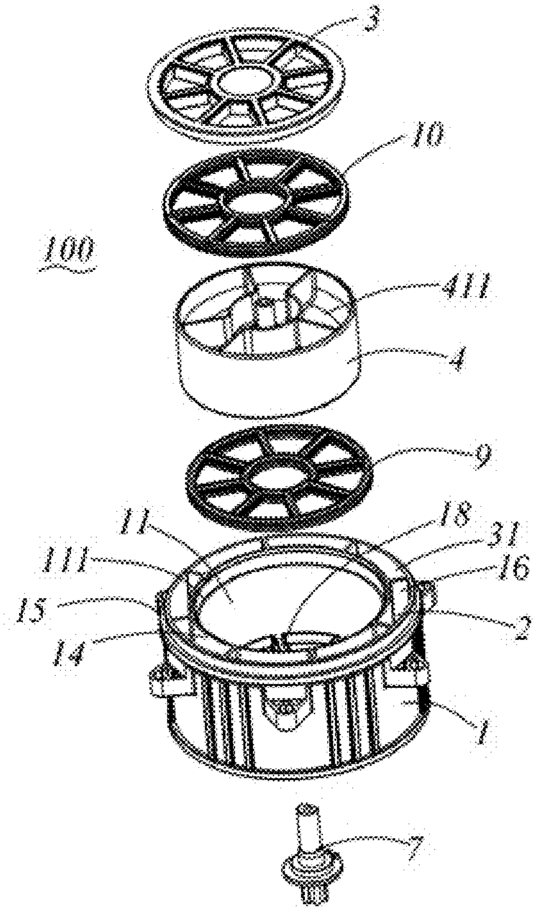
FIG. 17 is a schematic view of an exploded structure of a fourth embodiment of the present disclosure.

As shown in FIG. 13, the composite flow channel 403 penetrates the valve core 4 in the axial direction, and the shielding plate 404 partially shields the composite flow channel 403 in the radial direction. It can be understood that the composite flow channel 403 is formed by the horizontal flow channel 402 being in communication with the through flow channel 401. In FIG. 13, only are the through flow channel 401 and the composite flow channel 403 provided, but in other embodiments, it is also possible that the through flow channel 401, the horizontal flow channel 402, and the composite flow channel 403 are provided simultaneously.

In this embodiment, since the through flow channel 401 penetrates the valve core 4 in the axial direction, when fluid enters the valve core 4, a fluid pressure applied inside the valve core 4 is balanced, causing no problem of uneven force applied on the entire valve core 4. Moreover, by providing the through flow channel 401, more operation modes may be realized.

When the fluid is introduced into the first horizontal flow channel 4021, as long as the fluid having a same hydraulic pressure is introduced into the second horizontal flow channel 4022, the force applied on the entire valve core 4 is still balanced.

Similarly, when the fluid enters the composite flow channel 403, the force applied on the entire valve core 4 may still achieve balance. Therefore, pressures applied at two sides of the valve core 4 are made the same, thereby avoiding problems of inclining, large difficulty in valve opening, and easy wear of the valve core 4.

The valve body 1 is provided with at least two flow channel openings in communication with the through flow channel 401 and the horizontal flow channel 402.

The flow channel opening includes an inner flow channel opening 32 and an outer flow channel opening 31. The inner flow channel opening 32 and the outer flow channel opening 31 are disposed at an end of the valve body 1 in the axial direction, which is an end close to the first horizontal flow channel 4021. The outer flow channel opening 31 is disposed at an outer side of the inner flow channel opening 32 in the radial direction. In this embodiment, the number of outer flow channel openings 31 and the number of inner flow channel openings 32 are the same. Moreover, the outer flow channel openings 31 and the inner flow channel openings 32 are each arranged in a circumferential array along an axis of the multi-way valve 100.

The inner flow channel opening 32 is configured to be in communication with the first horizontal flow channel 4021 and the through flow channel 401. In this embodiment, when the first horizontal flow channel 4021 is in communication with at least two inner flow channel openings 32, the fluid enters the first horizontal flow channel 4021 from one of the inner flow channel openings 32 and is discharged from the other inner flow channel opening 32.

The outer flow channel 2 is configured to be in communication with an end of the through flow channel 401 away from the flow channel opening and the outer flow channel opening 31, and to be in communication with the second horizontal flow channel 4022 and the outer flow channel opening 31. Further, the support member 405 is disposed at a middle part of an end of the valve core 4 away from the flow channel opening, so that the through flow channel 401 and the second horizontal flow channel 4022 are spaced apart from the body by an end distance, enabling the through flow channel 401 and the second horizontal flow channel 4022 to be in communication with the outer flow channel 2.

In the embodiment, when the second horizontal flow channel 4022 is in communication with at least two outer flow channel openings 31, the fluid enters the second horizontal flow channel 4022 from one of the outer flow channel openings 31 and is discharged from the other outer flow channel openings 31.

When the inner flow channel opening 32 and the outer flow channel opening 31 are in communication with the through channel 401, the fluid enters the through channel 401 from the inner flow channel opening 32 and is discharged from the outer flow channel opening 31 through the outer flow channel 2.

The valve body 1 includes a body and a valve cover 3. The valve cover 3 is configured to limit a position of the valve core 4 in the axial direction, and the outer flow channel 2 is disposed between the body and the valve cover 3. The first horizontal flow channel 4021 is disposed close to the valve cover 3, and the flow channel opening is defined on the valve cover 3 and penetrates the valve cover 3. The valve cover 3 recesses inwardly towards a side of the body to form an accommodation portion. The outer sealing member 10 is disposed in the accommodation portion and abuts against the valve core 4 to isolate the through flow channel 401 and/or the first horizontal flow channel 4021 from each other. The inner sealing member 9 abuts against the valve core 4 to isolate the through flow channel 401 and/or the second horizontal flow channel 4022 from each other.

The composite flow channel 403 may be in communication with a plurality of outer flow channel openings 31 and a plurality of inner flow channel openings 32 simultaneously.

The transmission shaft 7 is configured to drive the valve core 4 to rotate, enabling the through flow channel 401 and the horizontal flow channel 402 to be in communication with different flow channel openings.

In this embodiment, the horizontal flow channel 402 is provided to be in communication with at least two flow channel openings for fluid transmission. By providing the first horizontal flow channel 4021 and the second horizontal flow channel 4022 having a projection area coinciding with the first horizontal flow channel 4021, the force applied on the entire valve core 4 is made balanced when the fluid is introduced to the two sides of the valve core 4 simultaneously. Moreover, when the fluid enters the through flow channel 401, the fluid pressure applied inside the valve core 4 is balanced, which also does not cause the problem of the uneven force of the entire valve core 4, and the valve core 4 is not easy to incline. Further, a friction force between the valve core 4 and the outer sealing member 10 and the inner sealing member 9 is not increased. By providing the flow channel opening on the valve cover 3 at a same side, mounting of an opponent part at another end of the multi-way valve 100 is unaffected.

In the multi-way valve 100 and the valve core 4 of the present disclosure, by providing the through flow channel 401 and the horizontal flow channel 402, the force of the valve core 4 is made balanced when the fluid is introduced, and the valve core 4 is not easily inclined. In this way, a risk of wear of the valve core 4 can be reduced, and the mounting of the opponent part is unaffected.

Fourth Embodiment

As shown in FIG. 16 to FIG. 20, a multi-way valve 100 with a pony-size valve cover of the embodiment includes a valve body 1, a valve core 4 disposed in the valve body 1, a valve cover 3 disposed at an end of the valve body 1 and configured to define a position of the valve core 4 in an axial direction, a second sealing member, i.e., an inner sealing member 9, and a transmission shaft 7.

The valve core 4 has at least one first valve core flow channel 411 and at least one second valve core flow channel 412 that have openings oppositely disposed in the axial direction. A projection of the first valve core flow channel 411 in the axial direction coincides with a projection of the second valve core flow channel 412 in the axial direction. Therefore, when fluid having a same pressure is introduced into the first valve core flow channel 411 and the second valve core flow channel 412, a fluid pressure applied inside the valve core 4 is balanced, and a problem of uneven force applied on the entire valve core 4 is not caused. Preferably, the number of first valve core flow channels 411 and the number of second valve core flow channels 412 are the same.

Figure 18:
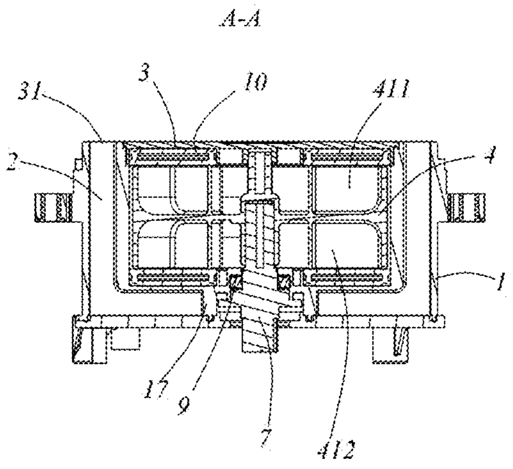
FIG. 18 is a schematic cross-sectional view along A-A direction as illustrated in FIG. 16.

As shown in FIG. 18, in an implementation, the valve core 4 is integrally formed, and the transmission shaft 7 drives the valve core 4 to rotate.

Figure 19:
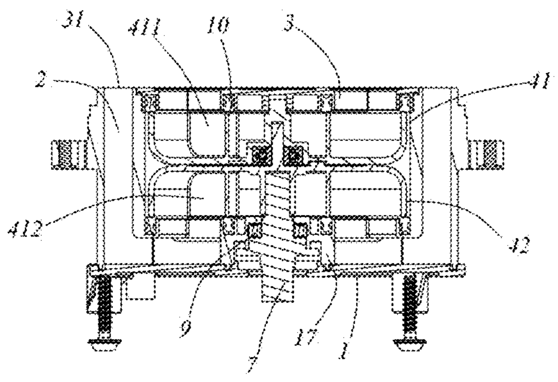
FIG. 19 is a schematic cross-sectional view of another implementation of a fourth embodiment of the present disclosure.
Figure 20:
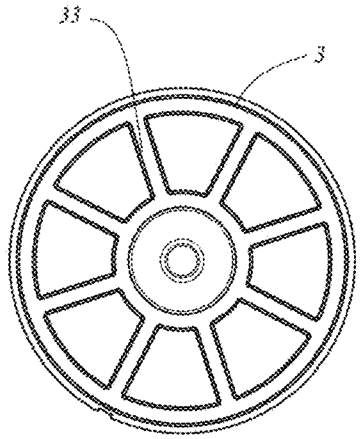
FIG. 20 is a schematic structural view of a valve cover of a fourth embodiment of the present disclosure.
Figure 21:
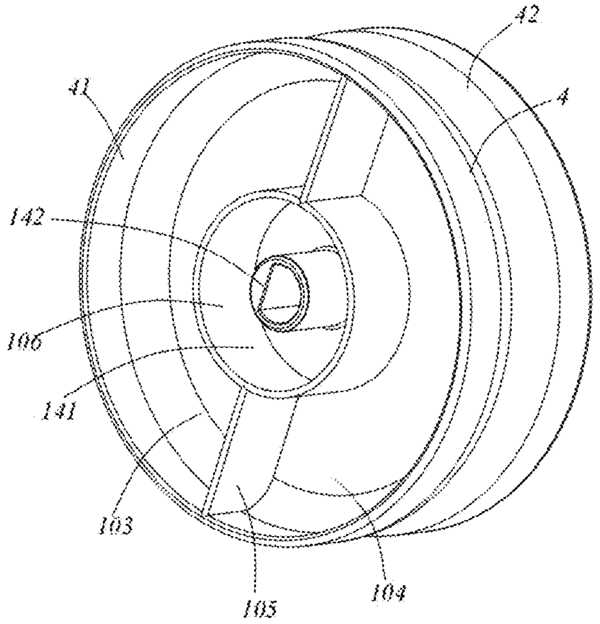
FIG. 21 is a schematic structural view of a valve core of a fifth embodiment of the present disclosure.
Figure 22:
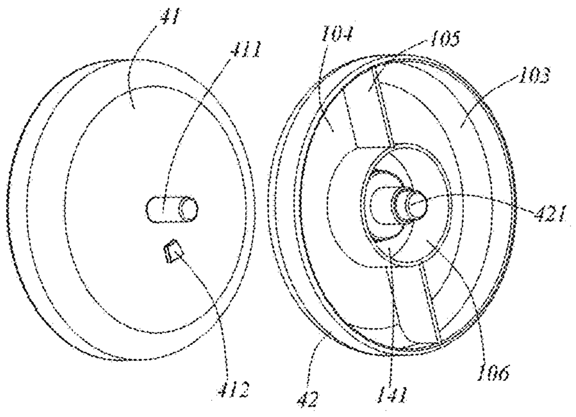
FIG. 22 is a schematic view of an exploded structure of a valve core of a fifth embodiment of the present disclosure.
Figure 23:
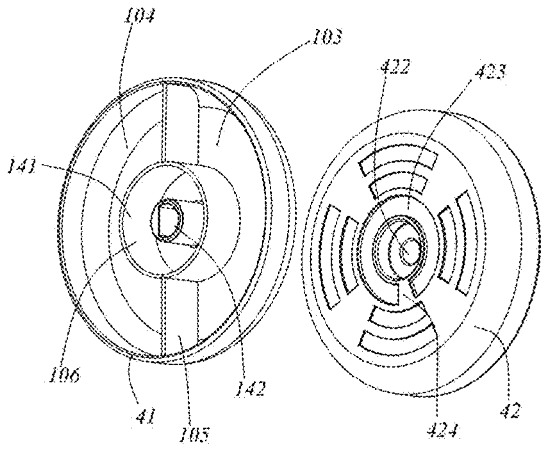
FIG. 23 is a schematic view of an exploded structure of a valve core in another direction of a fifth embodiment of the present disclosure.
Figure 24:
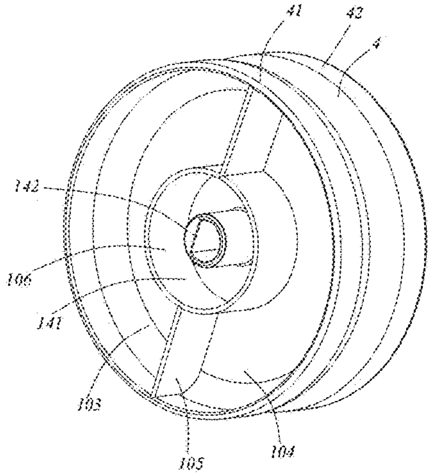
FIG. 24 is a schematic structural view of a valve core of a sixth embodiment of the present disclosure.
Figure 25:
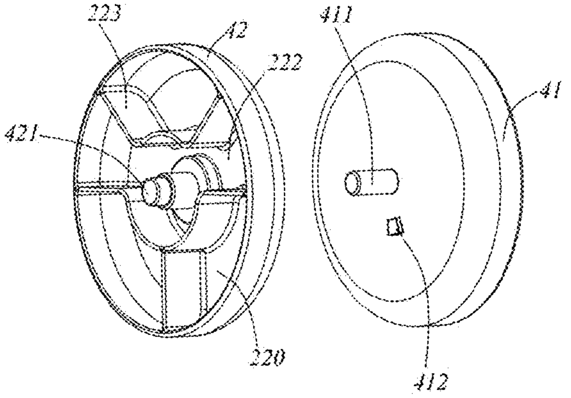
FIG. 25 is a schematic view of an exploded structure of a valve core of a sixth embodiment of the present disclosure.
Figure 26:
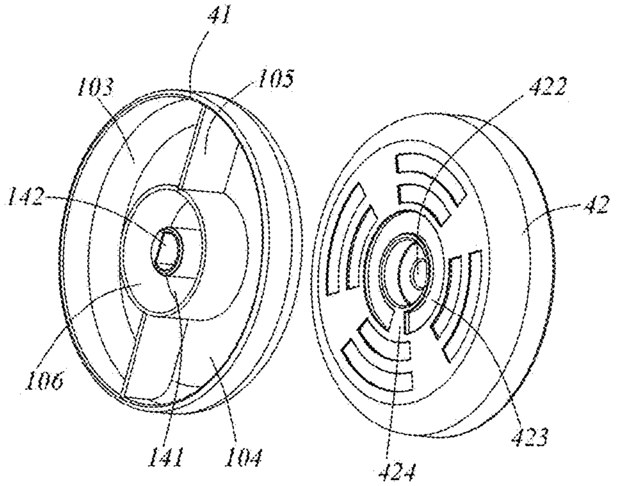
FIG. 26 is a schematic view of an exploded structure of a valve core in another direction of a sixth embodiment of the present disclosure.

As shown in FIG. 19, in another implementation, the valve core 4 includes a first valve core 43 and a second valve core 44 that are separately arranged with each other along an axis of the valve core 4. The first valve core flow channel 411 is disposed on the first valve core 43, and the second valve core flow channel 412 is disposed on the second valve core 44. In the implementation, the multi-way valve 100 further includes a linkage member. The linkage member drives the first valve core 43 and the second valve core 44 to rotate relative to each other.

The valve body 1 includes an accommodation cavity defined, i.e., a first wall 14 of a mounting cavity 11, a second wall 15 disposed outside the first wall 14 in a radial direction and surrounding the first wall 14, a separator 16 disposed between the first wall 14 and the second wall 15, a support member 17, an isolation member 18 extending in the radial direction from the support member 17 and connected to the first wall 14.

A length of the first wall 14 in the axial direction is smaller than a length of the second wall 15. Moreover, the first wall 14 is flush with the second wall 15 at an end close to the valve cover 3. An end of the first wall 14 away from the valve cover 3 is spaced apart from a bottom of the valve body 1.

The valve core 4 is disposed in the mounting cavity 11 and is spaced apart from each of two ends of the valve body 1, i.e., making the valve core 4 lower than an end surface of the valve body 1. An end of the first wall 14 close to the valve cover 3 protrudes inwardly to form a support portion 111. The valve cover 3 is disposed on the valve core 4 and placed on the support portion 111. The valve cover 3 is accommodated in the mounting cavity 11 of the valve body 1 and has an end surface flush with the end surface of the valve body 1.

The valve cover 3 only covers the valve core 4 instead of covering the end surface of the entire valve body 1. In this way, an area required for producing the valve cover 3 can be reduced. Meanwhile, a torque of rotation of the valve core 4 relative to the valve cover 3 can be lowered, to reduce wear.

The valve cover 3 is provided with a first valve core flow channel opening in communication with the first valve core flow channel 411, i.e., an inner flow channel opening 32. A side of the valve cover 3 towards the valve core 4 recesses inwardly to form an accommodation portion, i.e., an outer sealing member slot 33. The outer sealing member slot 33 has a first sealing member defined therein, i.e., an outer sealing member 10, to be separated from an inner flow channel opening 32.

The outer sealing member 10 abuts against the valve core 4. Since, an area of the valve cover 3 is reduced, correspondingly, an area of the outer sealing member 10 is also reduced, which can lower a production cost.

The valve core 4 is surrounded by the valve body 1, and the valve body 1 and the valve cover 3 are provided with a connection flow channel in communication with the second valve core flow channel 412, i.e., an outer flow channel 2. The outer flow channel 2 is disposed at an outer side of the valve core 4 and an outer side of the valve cover 3 in the radial direction. The outer flow channel 2 is disposed between the first wall 14 and the second wall 15. The outer flow channels 2 are divided into a plurality of outer flow channels 2 by the separator 16. The separator 16 is connected to the bottom of the valve body 1. Moreover, each of the outer flow channels 2 is configured to be in communication with the second valve core flow channel 412. An end of the valve body 1 is provided with a second valve core flow channel opening in communication with the outer flow channel 2, i.e., an outer flow channel opening 31. An end of the outer flow channel opening 31 close to the valve cover 3 from the outer flow channel 2 is exposed. The number of inner flow channel openings 32 and the number of outer flow channel openings 31 are the same. The inner flow channel opening 32 and the outer flow channel opening 31 are each arranged in a circumferential array along an axis of the valve core 4.

The support member 17 is disposed at an end of the valve core 4 away from the valve cover 3 and abuts against the valve body 1 to space the valve core 4 apart from the valve body 1, so that the second valve core flow channel 412 is in communication with the outer flow channel 2.

The inner sealing member 9 is disposed within the isolation member 18 and abuts against the valve core 4, to be separated from the second valve core flow channel 412.

With the multi-way valve 100 having a pony-size valve cover in this embodiment, only the valve cover 3 is disposed on the valve core 4, so that a volume of the valve cover 3 and a volume of the outer sealing member 10 can be lowered, thereby lowering the cost. Moreover, the valve cover 3 and the outer sealing member 10 are easier to mount without considering static sealing at an outer side of the valve core 4, lowering the influence of an assembly of the valve cover 3 on sealing of the inner flow channel opening 32 and the outer flow channel opening 31. The valve core 4 recesses to provide the valve cover 3 inside the valve body 1, such that an overall height of the multi-way valve 100 can be lowered.

The multi-way valve is the multi-way valve 100 according to any one or more of the first embodiment, the second embodiment, and the fourth embodiment. The valve core 4 includes a first valve core 41 and a second valve core 42. Two or four valve core flow channels are provided in the first valve core 41, and two or four valve core flow channels are provided in the second valve core 42. The present disclosure provides the following two embodiments for different numbers of valve cores 4 of valve core flow channels.

Fifth Embodiment

As shown in FIG. 1 and FIG. 21 to FIG. 23, in the embodiment, each of the number of valve core flow channels in the first valve core 41 and the number of valve core flow channels in the second valve core 42 is two. Each of the first valve core 41 and the second valve core 42 is provided with a third valve core flow channel 103 and a fourth valve core flow channel 104, a separator 105 configured to separate the third valve core flow channel 103 from the fourth valve core flow channel 104, and an abutting plate 106 configured to be connected to the separator 105 and disposed at a middle part of the first valve core 41 and a middle part of the second valve core 42.

In the embodiment, a cross-sectional projection of the third valve core flow channel 103 on the first valve core 41 coincides with a cross-sectional projection of the third valve core flow channel 103 on the second valve core 42. A cross-sectional projection of the fourth valve core flow channel 104 on the first valve core 41 coincides with a cross-sectional projection of the fourth valve core flow channel 104 on the second valve core 42. A cross-sectional projection of the separator 105 on the first valve core 41 coincides with a cross-sectional projection of the separator 105 on the second valve core 42. A cross-sectional projection of the abutting plate 106 on the first valve core 41 coincides with a cross-sectional projection of the abutting plate 106 on the second valve core 42. A height in the axial direction of the third valve core flow channel 103 of the first valve core 41 may be selected as required to be the same as or different from a height in the axial direction of the third valve core flow channel 103 of the second valve core 42. A height in the axial direction of the fourth valve core flow channel 104 of the first valve core 41 may be selected as required to be the same as or different from a height in the axial direction of the fourth valve core flow channel 104 of the second valve core 42. A height in the axial direction of the separator 105 of the first valve core 41 may be selected as required to be the same as or different from a height in the axial direction of the separator 105 of the second valve core 42. A height in the axial direction of the abutting plate 106 of the first valve core 41 may be selected as required to be the same as or different from a height in the axial direction of the abutting plate 106 of the second valve core 42. In this way, when a same liquid passes through the corresponding third valve core flow channel 103 and/or fourth valve core flow channel 104, the first valve core 41 and the second valve core 42 are subjected to a same force with opposite directions, thereby balancing a pressure at two sides of the first valve core 41 and the second valve core 42.

When each of the quantity of valve core flow channels in the first valve core 41 and the quantity of valve core flow channels in the second valve core 42 is two, the third valve core flow channels 103 and the fourth valve core flow channels 104 at a same side are symmetrically arranged. The two flow channels are provided in the first valve core 41 and the second valve core 42. In this way, the number of flow channels per unit area is reduced, and an area of the flow channel is increased. Further, a flow resistance of the fluid can be lowered.

The number of separators 105 is two. Moreover, the two separators 105 extend in each of a radial direction of the first valve core 41 and a radial direction of the second valve core 42.

The abutting plate 106 forms an accommodation cavity 141 having a circular cross section. A connection shaft 142 protruding and extending away from the second valve core 42 is arranged inside an accommodation cavity 141 of the first valve core 41. An actuator is pivotally connected to the connection shaft 142, to drive the valve core 4 to rotate in the valve body 1.

A rotation shaft 421 is provided in an accommodation cavity 141 of the second valve core 42. The valve cover is close to the second valve core 42 and abuts against the separator 105 and the abutting plate 106 in the second valve core 42, to separate the third valve core flow channel 103 from the fourth valve core flow channel 104. The valve cover 3 is provided with a rotation groove configured to be engaged with the rotation shaft 421 and a flow channel opening configured to be in communication with the third valve core flow channel 103 and the fourth valve core flow channel 104. The flow channel opening may be configured to be in communication with the third valve core flow channel 103 and the fourth valve core flow channel 104 on the first valve core 41, or may also be configured to be in communication with the third valve core flow channel 103 and the fourth valve core flow channel 104 on the second valve core 42. A height of the rotation shaft 421 in the axial direction is higher than the separator 105 in the second valve core 42.

A position-limiting shaft 411 protrudes from a side of the first valve core 41 towards the second valve core 42. A position-limiting cavity 422 is defined at the second valve core 42. The position-limiting cavity 422 is disposed in the position-limiting shaft 421. The position-limiting shaft 411 is inserted into and engaged with the position-limiting cavity 422 to limit positions of the first valve core 41 and the second valve core 42. Further, each of the position-limiting shaft 411 and the position-limiting cavity 422 is arranged coaxially with the first valve core 41 and the second valve core 42.

A side of the first valve core 41 towards the second valve core 42 is provided with a position-limiting block 412, and a side of the second valve core 42 towards the first valve core 41 is provided with a position-limiting groove 423 configured to accommodate the limiting block 412 and an abutting block 424 disposed in the position-limiting groove 423 and configured to abut against the position-limiting block 412. The position-limiting groove 423 and the second valve core 42 are coaxially arranged.

The position-limiting groove 423 and the second valve core 42 are coaxially arranged. In this embodiment, through an engagement of the position-limiting groove 423 and the position-limiting block 412, the first valve core 41 is rotatable relative to the second valve core 42. By providing an abutting block 424 to abut against the position-limiting block 412, the second valve core 42 may be driven by the first valve core 41 to rotate.

Sixth Embodiment

As shown in FIG. 1 and FIG. 24 to FIG. 26, in the embodiment, when the number of valve core flow channels on the first valve core 41 is two and the number of valve core flow channels on the second valve core 42 is four, the first valve core 41 is provided with a third valve core flow channel 103 and a fourth valve core flow channel 104, a first separator 105 configured to separate the third valve core flow channel 103 from the fourth valve core flow channel 104, an abutting plate 106 configured to be connected to the first separator 105 and disposed at a middle part of the first valve core 41, a position-limiting shaft 411 protrudes towards a side towards the second valve core 42, and a position-limiting block 412 disposed towards a side of the second valve core 42.

The third valve core flow channel 103 and the fourth valve core flow channel 104 are symmetrically arranged. In this embodiment, only two flow channels are provided in the first valve core 41. In this way, the number of flow channels per unit area is reduced, and an area of the flow channel is increased. Further, a flow resistance of the fluid can be lowered.

The number of separators 105 is two. Moreover, each of the two separators 105 extends in a radial direction of the first valve core 41.

The abutting plate 106 forms an accommodation cavity 141 having a circular cross section. A connection shaft 142 is arranged inside the accommodation cavity 141. An actuator is pivotally connected to the connection shaft 142, to drive the valve core 4 to rotate in the valve body 1.

The position-limiting block 412 protrudes towards a side of the second valve core 42. The position-limiting shaft 411 protrudes towards the second valve core 42. Moreover, the position-limiting shaft 411 is coaxially arranged with each of the first valve core 41 and the second valve core 42.

The second valve core 42 includes a common flow channel 220, a through flow channel, i.e., an opposite flow channel 222, a second separator 223 configured to separate the common flow channel 220 from the opposite flow channel 222, a rotation shaft 421 disposed towards a side away from the first valve core 41, a position-limiting groove 423 disposed towards a side of the first valve core 41 and configured to accommodate the position-limiting block 412, an abutting block 424 disposed in the position-limiting groove 423 and configured to abut against the position-limiting block 412, and a position-limiting cavity 422.

The number of common flow channels 220 is two or more. In the embodiment, the quantity of common flow channels 220 is three. Moreover, a side of the opposite flow channel 222 is provided with two common flow channels 220, and another side of the opposite flow channel 222 is provided with one common flow channel 220.

The rotation shaft 421 and the second valve core 42 are arranged coaxially. The rotation shaft 421 is located in the opposite flow channel 222.

The valve cover 3 is close to the second valve core 42 and abuts against the second separator 223, to separate the opposite flow channel 222 from the plurality of common flow channels 220. The valve cover 3 is provided with a rotation groove configured to be engaged with the rotation shaft 421 and a flow channel opening configured to be in communication with the opposite flow channel 222, the common flow channel 220, the third valve core flow channel 103, and the fourth valve core flow channel 104.

The rotation groove is inserted into and engaged with the rotation shaft 421, to be rotatably engaged with the valve core 4 when the valve core 4 rotates.

The position-limiting shaft 411 is inserted into and engaged with the position-limiting cavity 422 to limit positions of the first valve core 41 and the second valve core 42. The position-limiting cavity 422 is provided in the rotation shaft 421.

The position-limiting groove 423 and the second valve core 42 are coaxially arranged. In this embodiment, through an engagement of the position-limiting groove 423 and the position-limiting block 412, the first valve core 41 is rotatable relative to the second valve core 42. By providing an abutting block 424 to abut against the position-limiting block 412, the second valve core 42 is driven by the first valve core 41 to rotate.

In the multi-way valve 100 of the present disclosure, by providing the first valve core 41 and the second valve core 42, a pressure at two sides of the valve core 4 may be balanced, and the valve core 4 may be prevented from inclining and thus increasing wear.

The technical features of the above embodiments can be combined arbitrarily. In order to make the description simple, all possible combinations of the technical features in the foregoing embodiments are not described. However, as long as there is no conflict between the technical features, any combination of the technical features should be considered as falling in the scope of this specification.

Although several implementations of the present disclosure have been described above in a specific and detailed manner, the scope of the present disclosure cannot be construed as being limited to these implementations. It should be noted that, those skilled in the art can make various variations and improvements without departing from the concept of the present disclosure, and these variations and improvements shall fall within the protection scope of present disclosure as defined by the claims as attached.

What is claimed is:

1. A multi-way valve, comprising a valve body and a valve core rotatably disposed in the valve body, wherein:

the valve core comprises a first valve core and a second valve core, the first valve core has at least one first valve core flow channel defined therein and the second valve core has at least one second valve core flow channel defined therein; and an end of the valve body is provided with a flow channel opening in communication with the valve core flow channel in the first valve core and the valve core flow channel in the second valve core, respectively a plurality of flow channel openings, the plurality of flow channel openings comprise inner flow channel openings and outer flow channel openings, wherein the inner flow channel openings are distributed about a central axis of the valve core along a circumferential direction, and the outer flow channel openings are distributed at an outer side of the inner flow channel openings in a radial direction, the inner flow channel openings are in communication with the at least one first valve core flow channel in the first valve core, and the outer flow channel openings are in communication with the at least one second valve core flow channel in the second valve core.

2. The multi-way valve according to claim 1, wherein the first valve core flow channel in the first valve core and the second valve core flow channel in the second valve core have opposite openings.

3. The multi-way valve according to claim 1, wherein the first valve core and the second valve core are symmetrically arranged relative to a plane perpendicular to the central axis of the valve core.

4. The multi-way valve according to claim 1, further comprising a valve cover, the plurality of flow channel openings being formed on the valve cover.

5. The multi-way valve according to claim 4, wherein the valve body has an outer flow channel defined therein, the outer flow channel being in communication with the second valve core flow channel in the second valve core and the outer flow channel openings.

6. The multi-way valve according to claim 5, wherein the valve body has a valve core mounting cavity defined therein, the outer flow channel being in an L shape, a bottom of the valve core mounting cavity being spaced apart from a bottom of the valve body, and the outer flow channel comprising a plurality of outer flow channels distributed around the valve core mounting cavity.

7. The multi-way valve according to claim 6, wherein an end of the valve core mounting cavity away from the plurality of flow channel openings is provided with a plurality of communication holes in communication with the plurality of outer flow channels in a one-to-one correspondence.

8. The multi-way valve according to claim 7, wherein an inner sealing member engaged with the valve core is arranged at an end of the valve core mounting cavity close to the communication hole, the inner sealing member having a through hole corresponding to the plurality of communication holes.

9. The multi-way valve according to claim 1, wherein: each of the first valve core flow channel in the first valve core and the second valve core flow channel in the second valve core is in communication with at least two of the plurality of flow channel openings; and the first valve core and the second valve core are formed as one piece or separate parts.

10. The multi-way valve according to claim 1, wherein: the end of the valve body provided with the plurality of flow channel openings and the valve body are formed as one piece or separate parts; and when the end of the valve body is separated from the valve body, the end of the valve body provided with the plurality of flow channel openings is fixedly mounted on the valve body as a valve cover of the valve body.

11. The multi-way valve according to claim 10, wherein: a positioning rod is arranged in the valve core and configured to position the valve core, the valve cover having a positioning hole defined thereon, and the positioning rod being inserted into the positioning hole; and the other end of the valve body is mounted with a transmission shaft, the valve core being internally provided with a transmission sleeve configured to connect the transmission shaft.

12. A multi-way valve, comprising a valve body, a valve cover disposed at an end of the valve body, and a valve core rotatably disposed in the valve body, wherein:

the valve core has at least one first valve core flow channel and at least one second valve core flow channel that have openings oppositely disposed in an axial direction; and one of the valve cover and the valve body is provided with a plurality of inner flow channel openings, and the other of the valve cover and the valve body is provided with a plurality of outer flow channel openings, the plurality of inner flow channel openings and the plurality of outer flow channel openings being on the same side of the valve body in an axial direction thereof, wherein the plurality of inner flow channel openings are distributed about a central axis of the valve core along a circumferential direction, and the plurality of outer flow channel openings are distributed at an outer side of the plurality of inner flow channel openings in a radial direction, the plurality of inner flow channel openings are in communication with the at least one first valve core flow channel in the first valve core, and the plurality of outer flow channel openings are in communication with the at least one second valve core flow channel in the second valve core.

13. The multi-way valve according to claim 12, wherein: the valve core is surrounded by the valve body; and the valve body are provided with an outer flow channel in communication with the at least one second valve core flow channel, the outer flow channel being disposed at an outer side of the valve core and an outer side of the valve cover in a radial direction.

14. The multi-way valve according to claim 13, wherein: the valve cover has the plurality of inner flow channel openings in communication with the at least one first valve core flow channel; and an end of the valve body is provided with the plurality of outer flow channel openings in communication with the outer flow channel and the at least one second valve core flow channel.

15. The multi-way valve according to claim 14, wherein: the number of the at least one first valve core flow channel is the same as the number of the at least one second valve core flow channel; and the number of the inner flow channel openings is the same as the number of the outer flow channel openings.

16. The multi-way valve according to claim 14, wherein the plurality of inner flow channel openings and the plurality of outer flow channel openings are each arranged in a circumferential array along the central axis of the valve core.

17. The multi-way valve according to claim 14, wherein an outer sealing member slot is formed on the valve cover by inwardly recessing a side of the valve cover facing towards the valve core, an outer sealing member being inserted in the outer sealing member slot to separate the plurality of inner flow channel openings.

18. The multi-way valve according to claim 12, wherein the valve body comprises a support member disposed at an end of the valve core away from the valve cover, the support member abutting against the valve body to space the valve core apart from the valve body.

19. The multi-way valve according to claim 12, further comprising an inner sealing member disposed at an end of the valve core away from the valve cover and abutting against the valve core.

20. The multi-way valve according to claim 12, wherein the valve core is located in the valve body at a lower level than an end surface of the valve body, the valve cover being accommodated in the valve body, and an end surface of the valve cover being flush with the end surface of the valve body.

* * * * *